United States Patent
Lee et al.

(10) Patent No.: US 12,555,206 B2
(45) Date of Patent: Feb. 17, 2026

(54) INVERSE KERNEL-BASED DEFOCUS DEBLURRING METHOD AND APPARATUS

(71) Applicant: POSTECH Research and Business Development Foundation, Pohang-si (KR)

(72) Inventors: Seung Yong Lee, Seoul (KR); Hyeong Seok Son, Pohang-si (KR); Sung Hyun Cho, Pohang-si (KR); Jun Yong Lee, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 669 days.

(21) Appl. No.: 17/974,383

(22) Filed: Oct. 26, 2022

(65) Prior Publication Data

US 2023/0196520 A1 Jun. 22, 2023

(30) Foreign Application Priority Data

Dec. 20, 2021 (KR) .................. 10-2021-0182797
Feb. 14, 2022 (KR) .................. 10-2022-0019174

(51) Int. Cl.
*G06T 5/73* (2024.01)
*G06N 3/02* (2006.01)
(Continued)

(52) U.S. Cl.
CPC .................. *G06T 5/73* (2024.01); *G06N 3/02* (2013.01)

(58) Field of Classification Search
CPC ... G06T 5/73; G06T 5/60; G06T 2207/20081; G06T 2207/20084; G06N 3/02; G06N 3/0455; G06N 3/0464; G06N 3/088
(Continued)

(56) References Cited

U.S. PATENT DOCUMENTS 10,701,394 B1 * 6/2020 Caballero ................ G06N 3/08
10,992,845 B1 * 4/2021 Seely .................. H04N 5/2226
(Continued)

FOREIGN PATENT DOCUMENTS

KR    20100079658 A    7/2010
KR    20210085403 A    7/2021
KR    20210086493 A    7/2021

OTHER PUBLICATIONS

Tang, Chang, et al. "Defusionnet: Defocus blur detection via recurrently fusing and refining multi-scale deep features." Proceedings of the IEEE/CVF conference on computer vision and pattern recognition. 2019. (Year: 2019).*
(Continued)

*Primary Examiner* — Chineyere Wills-Burns
(74) *Attorney, Agent, or Firm* — Morgan, Lewis & Bockius LLP

(57) ABSTRACT

The present disclosure provides a method of effectively deblurring a defocus blur in an input image based on an inverse kernel. The defocus deblurring method includes: generating, by an encoder network, an input feature map by encoding the input image; filtering, by an atrous convolution network including a plurality of atrous convolutional layers arranged in parallel, the input feature map to generate an output feature map having reduced blur component; and generating, by a decoder network, an output image having reduced blur from the output feature map with the reduced blur component and the input image.

14 Claims, 10 Drawing Sheets

(A)  (B)  (C)

(51) Int. Cl.
　　　*G06N 3/0455*　　(2023.01)
　　　*G06N 3/0464*　　(2023.01)
　　　*G06N 3/088*　　　(2023.01)
　　　*G06T 5/60*　　　(2024.01)

(58) Field of Classification Search
　　　USPC .......................................................... 382/255
　　　See application file for complete search history.

(56) References Cited

U.S. PATENT DOCUMENTS

| | | | | |
|---|---|---|---|---|
| 2013/0071028 | A1* | 3/2013 | Schiller | G06T 5/73 |
| | | | | 382/180 |
| 2013/0243319 | A1* | 9/2013 | Cho | G06T 5/40 |
| | | | | 382/168 |
| 2018/0259970 | A1* | 9/2018 | Wang | G06V 30/19173 |
| 2019/0347771 | A1* | 11/2019 | Suszek | G06T 5/20 |
| 2020/0160533 | A1* | 5/2020 | Du | G06V 10/454 |
| 2021/0183022 | A1* | 6/2021 | Wang | G06T 5/60 |

OTHER PUBLICATIONS

Chang, Yanfen. "Research on de-motion blur image processing based on deep learning." Journal of Visual Communication and Image Representation 60 (2019): 371-379. (Year: 2019).*

Y. -G. Shin, M. -C. Sagong, Y. -J. Yeo, S. -W. Kim and S. -J. Ko, "PEPSI++: Fast and Lightweight Network for Image Inpainting," in IEEE Transactions on Neural Networks and Learning Systems, vol. 32, No. 1, pp. 252-265, Jan. 2021, doi: 10.1109/TNNLS.2020.2978501. (Year: 2021).*

Tang, Chang, et al. "Defusionnet: Defocus blur detection via recurrently fusing and refining multi-scale deep features." Proceedings of the IEEE/CVF conference on computer vision and pattern recognition. (Year: 2019).*

Zhang, Xianlin, et al. "Defocus deblurring: a designed deep model based on CNN." Journal of Electronic Imaging 30.6 (2021): 063013-063013. (Year: 2021).*

Brehm et al., "High-Resolution Dual-Stage Multi-Level Feature Aggregation for Single Image and Video Deblurring," Proceedings of the IEEE/CVF Conference on Computer Vision and Pattern Recognition (CVPR) Workshops, 2020, pp. 458-459.

Huang et al., "See more than once: Kernel-sharing atrous convolution of semantic segmentation," Neurocomputing, vol. 443, Jul. 5, 2021, pp. 26-34.

Lee et al., "Wide Receptive Field and Channel Attention Network for JPEG Compressed Image Deblurring," Proceedings of the IEEE/CVF Conference on Computer Vision and Pattern Recognition (CVPR) Workshops, 2021, pp. 304-313.

Abdullah Abuolaim et al., Defocus Deblurring Using Dual-Pixel Data, European Conference on Computer Vision (ECCV), pp. 1-27.

Kelvin Xu et al., Show, Attend, and Tell: Neural Image Caption Generation with Visual Attention.

Yulun Zhang et al., Image Super-Resolution Using Very Deep Residual Channel Attention Networks, Computer Vision Foundation.

Junyong Lee et al., Deep Defocus Map Estimation using Domain Adaptation, Computer Vision Foundation, pp. 12220-12230.

Ali Karaali et al., Edge-Based Defocus Blur Estimation with Adaptive Scale Selection, Article in IEEE Transactions on Image Processing, pp. 1-12, Mar. 2018.

Jianping Shi et al. Just Noticeable Defocus Blur Detection and Estimation, Computer Vision Foundation, pp. 657-665.

\* cited by examiner

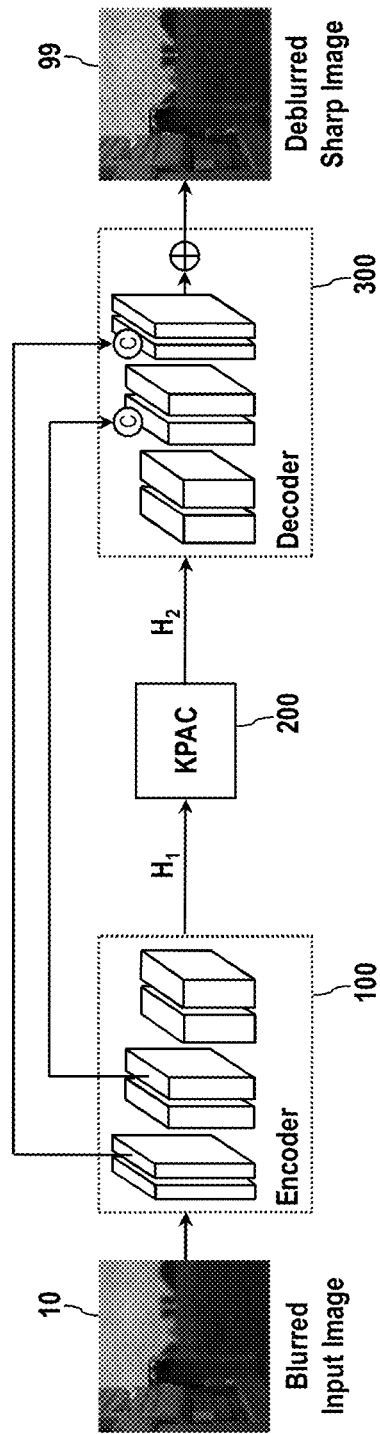

FIG. 3

| layer type(#) | size | stride | out | act. |
|---|---|---|---|---|
| Encoder (3-level) | | | | |
| Conv1_1 | 5×5 | (1, 1) | 48 | lrelu |
| Conv1_2 | 3×3 | (1, 1) | 48 | lrelu |
| Conv2_1 | 3×3 | (2, 2) | 48 | lrelu |
| Conv2_2 | 3×3 | (1, 1) | 48 | lrelu |
| Conv3_1 | 3×3 | (2, 2) | 96 | lrelu |
| Conv3_2 | 3×3 | (1, 1) | 96 | lrelu |
| Conv4_1 | 3×3 | (2, 2) | 96 | lrelu |
| Conv4_2 | 3×3 | (1, 1) | 96 | lrelu |
| KPAC blocks | | | | |
| KPAC1 | 5×5 | (1, 1) | 96 | lrelu |
| KPAC2 | 5×5 | (1, 1) | 96 | lrelu |
| concat | Conv4_2, KPAC1, KPAC2 | | | |
| Decoder (3-level) | | | | |
| Conv5_1 | 3×3 | (1, 1) | 96 | lrelu |
| Conv5_2 | 3×3 | (1, 1) | 96 | lrelu |
| Deconv1 | 4×4 | (2, 2) | 96 | lrelu |
| concat | Deconv1, Conv3_2 | | | |
| Conv6 | 3×3 | (1, 1) | 96 | lrelu |
| Deconv2 | 4×4 | (2, 2) | 48 | lrelu |
| concat | Deconv2, Conv2_2 | | | |
| Conv7 | 3×3 | (1, 1) | 48 | lrelu |
| Deconv3 | 4×4 | (2, 2) | 48 | lrelu |
| concat | Deconv3, Conv1_2 | | | |
| Conv8 | 5×5 | (1, 1) | 3 | lrelu |
| add | Conv8, Input | | | -- |

FIG. 5

| layer type(#) | size | dilation | out | act. |
|---|---|---|---|---|
| Scale attention module | | | | |
| AC | 5 × 5 | (2, 2) | 32 | lrelu |
| AC | 5 × 5 | (2, 2) | 32 | lrelu |
| AC | 5 × 5 | (2, 2) | 16 | lrelu |
| AC | 5 × 5 | (2, 2) | 16 | lrelu |
| Conv $\{\alpha_1, ..., \alpha_5\}$ | 5 × 5 | (1, 1) | 5 | sigmoid |
| Shape attention module | | | | |
| global average pooling | | | 96 | - |
| fully connected layer | | | 16 | lrelu |
| fully connected layer ($\beta$) | | | 48 | sigmoid |
| Multiple atrous convolutions | | | | |
| AC1 | 5 × 5 | (1, 1) | 48 | lrelu |
| AC2 | 5 × 5 | (2, 2) | 48 | lrelu |
| AC3 | 5 × 5 | (3, 3) | 48 | lrelu |
| AC4 | 5 × 5 | (4, 4) | 48 | lrelu |
| AC5 | 5 × 5 | (5, 5) | 48 | lrelu |
| Fusion | | | | |
| cocnat | $\alpha_1 \times \beta \times AC1, ..., \alpha_5 \times \beta \times AC5$ | | | |
| Conv | 3 × 3 | (1, 1) | 96 | lrelu |

|  | PSNR (dB) | Parameters (M) |
|---|---|---|
| w/o weight sharing | 24.78 | 2.50 |
| w/ weight sharing | 25.21 | 1.58 |

FIG. 11

|  | Blurry input | Number of KPAC blocks | | | |
| --- | --- | --- | --- | --- | --- |
|  |  | 1 | 2 | 3 | 4 |
| PSNR (dB) | 23.92 | 24.82 | 25.21 | 25.25 | 25.14 |
| SSIM (dB) | 0.812 | 0.836 | 0.842 | 0.842 | 0.841 |
| Params (M) | - | 1.05 | 1.58 | 2.11 | 2.64 |

FIG. 12

|  | PSNR (dB) | Parameters (M) | Computations (BFLOPs) |
| --- | --- | --- | --- |
| JNB [CVPR 2015] | 22.43 | - | - |
| EBDB [TIP 2018] | 23.41 | - | - |
| DMENet [CVPR 2019] | 23.34 | 26.94 | - |
| DPDNet [ECCV 2020] | 24.42 | 32.25 | 1980 |
| Ours | 25.24 | 2.06 | 197 |

INVERSE KERNEL-BASED DEFOCUS DEBLURRING METHOD AND APPARATUS

CROSS-REFERENCE TO RELATED APPLICATION

The present application claims convention priorities under 35 U.S.C. § 119(a) based on Korean Patent Applications No. 10-2021-0182797 filed on Dec. 20, 2021, and No. 10-2022-0019174 filed on Feb. 14, 2022, the entire contents of which are incorporated herein in their entireties by reference.

BACKGROUND

1. Technical Field

The present disclosure relates to a method and apparatus for enhancing a quality of an image and, more particularly, to a method and apparatus for removing or mitigating a defocus blur.

2. Related Art

A defocus blur in an image is a blur caused by an out-of-focus state when capturing the image and occurs frequently in a camera having a shallow depth of focus. A shape of the blur depends on an aperture shape and a lens design of the camera, and a size of the blur varies upon a depth of a scene point and intrinsic camera parameters. In a defocused image, a spatial variation of the blur size is large while the spatial variation of the blur shape is relatively small. It is difficult to accurately estimate and remove the defocus blurs spatially varying in both the size and the shape.

The defocus blur may result in irreversible information loss and significantly deteriorate an image quality. A number of deblurring methods have been proposed to solve this problem. Conventional two-step approaches reduce a complexity of the defocus deblurring by assuming an isotropic kernel for the blur shape such as a disc or Gaussian and estimating only the blur size. Based on the assumption on the blur shape and the estimated blur size, a defocus map containing a per-pixel blur size is estimated and then non-blind deconvolutions are performed on the image to remove the blur. Deblurring performances of these methods, however, are limited by various factors such as an error in the blur size estimation or a deviation of an actual blur size from the assumed blur model and the performance of the non-blind deconvolutions. For example, real-world defocused images may have to be associated with more complex kernel shapes than the disk shape or the Gaussian shape, and this discrepancy often hinders accurate defocus map estimation and successful defocus deblurring.

Recently, various deblurring methods based on deep learning have been proposed. However, convolutional neural networks (CNN) used in such methods are not suitable for defocus deblurring applications where the blur kernels change for each pixel in the image, and thus the methods require a large amount of computation in their implementations and reveal limited performances.

SUMMARY

An exemplary embodiment of the present disclosure provides a method of effectively deblurring a defocus blur in an image based on an inverse kernel.

An exemplary embodiment of the present disclosure provides an apparatus for effectively deblurring a defocus blur in an image based on an inverse kernel.

The present disclosure performs a defocus deblurring based on an inverse kernel. In order to reduce a complexity of the defocus deblurring, the present disclosure utilizes a property of the inverse kernel that the blur shapes are similar among pixels although the blur sizes may spatially vary. Instead of assuming a particular blur shape as in prior arts, a common reference blur shape in an image is predicted and only the blur size is estimated for each pixel position to effectively reduce the defocus blur of which size changes depending on the pixel position. Inverse kernels of only a few sizes are generated, and the blurs of the other sizes may be removed by combining the deblurring results using the inverse kernels generated in advance. By varying pixel-wise weights for combining the deblurring results of the inverse kernels, it is possible to bring a result of deblurring using a separate inverse kernel for each pixel. The inverse kernel of an arbitrary size may be implemented by a plurality of convolutional layers, which share kernel weights to represent the same blur shape. Dilated kernels are used to enable the weight sharing among the convolutional layers which contain different numbers of weights. The use of the dilated kernels enables to represent various kernel sizes while maintaining an effective number of weights in the convolutional kernels.

According to an aspect of an exemplary embodiment, provided is a method of reducing defocus blur from an input image. The method includes: generating, by an encoder network, an input feature map by encoding the input image; filtering, by an atrous convolution network including a plurality of atrous convolutional layers arranged in parallel, the input feature map to generate an output feature map having reduced blur component; and generating, by a decoder network, an output image having reduced blur from the output feature map with the reduced blur component and the input image.

The operation of filtering the input feature map to generate the output feature map having reduced blur component may include: filtering the input feature map consecutively by a plurality of atrous convolution network connected in series to repeatedly reduce the blur component.

The plurality of atrous convolutional layers may include respective convolutional kernels containing kernel weights shared with the other atrous convolutional layers.

The convolutional kernels of the plurality of atrous convolutional layers may be dilated by dilation rates different from each other.

The operation of filtering the input feature map to generate the output feature map having reduced blur component may include: performing convolutions between the input feature map and each of the convolutional kernels of the plurality of atrous convolutional layers in parallel to acquire a plurality of convolution results; and nonlinearly aggregating the plurality of convolution results by concatenating the plurality of convolution results and performing a convolution between an concatenation result and a network weight.

The operation of filtering the input feature map to generate the output feature map having reduced blur component may further include: determining scale attention maps each comprising pixel-wise weights for respective one of the plurality of convolution results. In such a case, the operation of nonlinearly aggregating the plurality of convolution results may include: multiplying each of the plurality of convolution results by a corresponding scale attention map;

concatenating a plurality of multiplication results; and performing the convolution between the concatenation result and the network weight.

The operation of filtering the input feature map to generate the output feature map having reduced blur component may further include: determining a channel-wise weight vector for compensating for a variation of a shape of the defocus blur in the input image according to a pixel position. In such a case, the operation of nonlinearly aggregating the plurality of convolution results may include: multiplying each of the plurality of convolution results by a corresponding scale attention map; multiplying each of a plurality of multiplication results by the channel-wise weight vector; concatenating a plurality of multiplication results multiplied by the channel-wise weight vector; and performing the convolution between the concatenation result and the network weight.

According to another aspect of an exemplary embodiment, provided is an apparatus for reducing defocus blur from an input image. The apparatus includes: a memory storing program instructions; and processor coupled to the memory and executing the program instructions stored in the memory. The program instructions, when executed by the processor, causes the processor to: generate an input feature map by encoding the input image; filter, by an atrous convolution network comprising a plurality of atrous convolutional layers arranged in parallel, the input feature map to generate an output feature map having reduced blur component; and generate an output image having reduced blur from the output feature map with the reduced blur component and the input image.

The instructions causing the processor to filter the input feature map to generate the output feature map having reduced blur component may include: program instructions, when executed by the processor, causing the processor to filter the input feature map consecutively by a plurality of atrous convolution network connected in series to repeatedly reduce the blur component.

The plurality of atrous convolutional layers may include respective convolutional kernels containing kernel weights shared with the other atrous convolutional layers.

The convolutional kernels of the plurality of atrous convolutional layers may be dilated by dilation rates different from each other.

The atrous convolution network may include: an atrous convolution module comprising the plurality of atrous convolutional layers arranged in parallel and configured to perform convolutions between the input feature map and respective convolutional kernels in parallel to acquire a plurality of convolution results; and a fusion module configured to nonlinearly aggregate the plurality of convolution results by concatenating the plurality of convolution results and performing a convolution between an concatenation result and a network weight.

The atrous convolution network may further include a scale attention module configured to determine scale attention maps each comprising pixel-wise weights for respective one of the plurality of convolution results. In such a case, the fusion module nonlinearly may aggregate the plurality of convolution results by multiplying each of the plurality of convolution results by a corresponding scale attention map, concatenating a plurality of multiplication results, and performing the convolution between the concatenation result and the network weight.

The atrous convolution network may further include a shape attention module configured to determine a channel-wise weight vector for compensating for a variation of a shape of the defocus blur in the input image according to a pixel position. In such a case, the fusion module may nonlinearly aggregate the plurality of convolution results by multiplying each of the plurality of convolution results by a corresponding scale attention map, multiplying each of a plurality of multiplication results by the channel-wise weight vector, concatenating a plurality of multiplication results multiplied by the channel-wise weight vector, and performing the convolution between the concatenation result and the network weight.

The present disclosure performs the defocus blur based on an observation of the property of the defocus blur that observation that, when only the size of the defocus blur changes while keeping the shape, the shape of the corresponding inverse kernel remains the same and only the scale changes.

According to an exemplary embodiment, the defocus blur of an arbitrary size may be dealt with efficiently by using a plurality of convolutional layers having different kernel sizes in parallel and combining the outputs of the plurality of convolutional layers. The plurality of convolutional layers share kernel weights and may be atrous convolutional layers including kernels dilated at dilation rates different from each other to ensure the sharing of the weights. A difference in the size and shape of the convolutional kernels according to a pixel position may be compensated for by a scale attention module and a shape attention modules, respectively.

Accordingly, the defocus deblurring method of the present disclosure may effectively reduce the defocus blur. In particular, the method of the present disclosure achieved higher deblurring performance with a network of a much smaller size and a less computational amount than existing convolutional neural networks. Since the apparatus of the present disclosure can be implemented with a small-sized network, it may be easily mounted on a mobile device.

BRIEF DESCRIPTION OF THE DRAWINGS

In order that the disclosure may be well understood, there will now be described various forms thereof, given by way of example, reference being made to the accompanying drawings, in which:

FIG. 2 is a block diagram of a defocus deblurring apparatus according to an exemplary embodiment of the present disclosure;

FIG. 3 is a table summarizing an example of a detailed structure of the defocus deblurring apparatus;

FIG. 5 is a table summarizing an example of a more detailed structure of the KPAC unit;

FIG. 11 is a table summarizing comparison results of deblurring effects according to the number of the KPAC units;

FIG. 12 is a table summarizing results of quantitative comparison with conventional deblurring methods.

Figure 1:
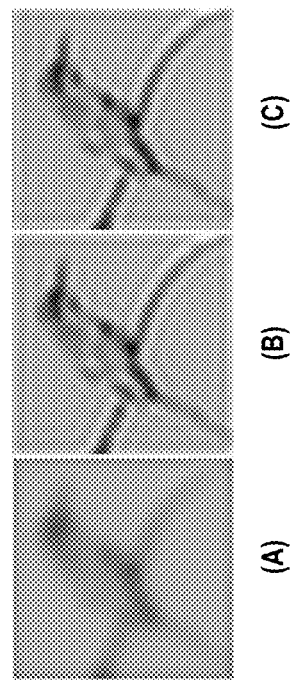
FIG. 1 shows an exemplary blurred image along with exemplary enhanced images deblurred by use of an inverse kernel for an upsampled blur kernel and an upsampled kernel for an inverse blur kernel, respectively, for a comparison.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

In the description of exemplary embodiments of the present disclosure, "at least one of A and B" may mean "at least one of A or B" or "at least one of combinations of one or more of A and B". In addition, in the description of exemplary embodiments of the present disclosure, "one or more of A and B" may mean "one or more of A or B" or "one or more of combinations of one or more of A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings. In order to facilitate general understanding in describing the present disclosure, the same components in the drawings are denoted with the same reference signs, and repeated description thereof will be omitted.

A theoretical basis of a defocus deblurring method based on an inverse kernel according to an exemplary embodiment of the present disclosure will now be described first.

A blurry image can be expressed by a convolution of a blur kernel and a latent sharp image as shown in Equation 1 according to a simple blur model.

$$y = k * x \qquad \text{[Equation 1]}$$

where 'y' denotes the blurry image, 'x' denotes the latent sharp image, and 'k' denotes the blur kernel. Since a spatial convolution can be transformed to an element-wise multiplication in the frequency domain, Equation 1 may be converted into Equation 2.

$$F(y) = F(k) \cdot F(x) \qquad \text{[Equation 2]}$$

where 'F( )' denotes a discrete Fourier transform. Thus, a latent sharp image F(x) in the frequency domain may be obtained by multiplying the blurry image F(y) by an inverse of the blur kernel F(k), and the latent sharp image 'x' in the spatial domain may be expressed by using the inverse kernel $k^\dagger$.

$$\begin{aligned} x &= F^{-1}\left(\frac{1}{F(k)}\right) * F^{-1}(F(y)) \\ &= F^{-1}\left(\frac{1}{F(k)}\right) * y \\ &= k^\dagger * y \end{aligned} \qquad \text{[Equation 3]}$$

where '$F^{-1}$( )' denotes an inverse discrete Fourier transform, and '$k^\dagger$' is a spatial pseudo inverse kernel.

The deblurring based on the inverse kernel reveal operational characteristics similar to those of a processing in a convolutional neural network because the two processes are performed through convolutional operations. In other words, the deblurring based on the inverse kernel and the convolutional neural network have similarities in the computation process. Based on this observation, the deblurring based on an inverse kernel may be implemented using the convolutional neural network according to the present disclosure.

Since the blur kernel may change depending on the pixel position, the deblurring of the defocus blur may require a separate inverse kernel for each pixel position. However, it is very inefficient to estimate and apply a separate inverse kernel for each pixel. In order to increase an efficiency of estimation and application of the inverse kernel, the inventors analyzed the properties of the inverse kernel for the defocus deblurring and derived significant properties. That is, even though the size of the defocus blur may change in the image depending on the pixel position, the shape of the defocus blur hardly changes throughout the image. Further, in case that the blur and the blur kernel change only in their sizes depending on the pixel position while maintaining their shapes, the inverse kernel may also change only in its size while maintaining its shape.

When the shape of the inverse kernel 'k†' remains the same regardless of the change in the spatial size of the blur kernel 'k', the inverse kernel of any size may be obtained from the inverse kernel having the same shape but a different size by Equation (4).

$$\left(\frac{1}{s^2}k_{\uparrow s}\right)^\dagger = \frac{1}{s^2}\left(k^\dagger_{\uparrow s}\right) \quad \text{[Equation 4]}$$

Here, '↑s' denotes a general upsampling operation with the scale factor 's' in the spatial domain.

$$\frac{1}{s^2}k_{\uparrow s},$$

is a kernel k' having a resolution upsampled by the scale factor, and $$\left(\frac{1}{s^2}k_{\uparrow s}\right)^\dagger$$

is an inverse kernel the kernel k'.

$$\frac{1}{s^2}\left(k^\dagger_{\uparrow s}\right)$$

is an upsampled kernel, for the inverse kernel 'k†' of the blur kernel 'k', upsampled by the same scale factor.

$$\frac{1}{s^2},$$

is used to normalize kernel weights.

Equation 4 may also be proved mathematically as follows.

For a 2D image l of size w×h, the spatial upsampling may be performed by zero-padding to a discrete Fourier transform of the image l. Assuming that '↑' denotes the upsampling operation by the scale factor 's' as above, an upsampled result of the image l by the scaling factor 's' may be represented by '$l_{\uparrow s}$' and the discrete Fourier transform '$L_{\uparrow s}$' of the upsampled image '$l_{\uparrow s}$' is defined in a range $$\left(-\frac{sw}{2} \leq u \leq \frac{sw}{2}, -\frac{sh}{2} \leq v \leq \frac{sh}{2}\right)$$

and can be obtained by Equation 5.

$$L(u,v)_{\uparrow s} = \begin{cases} L(u,v) & \left(-\frac{sw}{2} \leq u \leq \frac{sw}{2}, -\frac{sh}{2} \leq v \leq \frac{sh}{2}\right) \\ 0 & \text{otherwise} \end{cases} \quad \text{[Equation 5]}$$

Here, L(u, v) is the discrete Fourier transform of image l, and u and v are pixel indices in the frequency domain. L(0, 0) corresponds to a DC component of L. This zero padding-based upsampling is mathematically equivalent to a convolution with a sinc function kernel.

For a notational simplicity, '↑s' is used to indicate the zero-padding operation for the upsampling in the frequency domain as well as the upsampling operation in the spatial domain. In addition, the pixel coordinates (u, v) are omitted in any representation, e.g., '$L(u,v)_{\uparrow s}$' is represented by '$L_{\uparrow s}$'.

The inverse kernel 'k†' of the blur kernel 'k' may be calculated by using a Wiener deconvolution as shown in Equation 6.

$$k^\dagger = F^{-1}\left(\frac{\overline{F(k)}}{|F(k)|^2 + \epsilon}\right) \quad \text{[Equation 6]}$$

Here, F(k) is the discrete Fourier transform of the blur kernel 'k', and $\overline{F(k)}$ is the complex conjugate of F(k). The division operation is carried out in an element-wise manner. '$\epsilon$' is a noise parameter. When there is no noise (i.e., $\epsilon=0$), the inverse kernel 'k†' is equivalent to a direct inverse kernel $$F^{-1}\left(\frac{1}{F(k)}\right).$$

We first prove an equality relation of Equation 7.

$$(k_{\uparrow s})^\dagger = k^\dagger_{\uparrow s} \quad \text{[Equation 7]}$$

Regarding the left side of Equation 7, the upsampling of the blur kernel 'k' may be obtained using the zero padding-based upsampling as Equation 8.

$$(k_{\uparrow s})^\dagger = k^\dagger_{\uparrow s} \quad \text{[Equation 8]}$$

Then, Equation 9 may be obtained, from Equation 5, in the frequency domain.

$$F(k_{\uparrow s}) = F(k)_{\uparrow s} = \begin{cases} F(k) & \left(-\frac{w}{2} \leq u \leq \frac{w}{2}, -\frac{h}{2} \leq v \leq \frac{h}{2}\right) \\ 0 & \text{otherwise} \end{cases} \quad \text{[Equation 9]}$$

The inverse kernel $(k_{\uparrow s})^\dagger$ for the upsampled kernel $k_{\uparrow s}$ may be derived by Equation 10 from Equation 6.

$$(k_{\uparrow s})^\dagger = F^{-1}\left(\frac{\overline{F(k_{\uparrow s})}}{|F(k_{\uparrow s})|^2 + \epsilon}\right) \quad \text{[Equation 10]}$$

Equation 11 may be obtained, from Equation 9, in the frequency domain.

$$F((k_{\uparrow s})^\dagger) = \frac{\overline{F(k_{\uparrow s})}}{|F(k_{\uparrow s})|^2 + \epsilon}$$

$$= \begin{cases} \frac{\overline{F(k)}}{|F(k)|^2 + \epsilon} & \left(-\frac{w}{2} \leq u \leq \frac{w}{2}, -\frac{h}{2} \leq v \leq \frac{h}{2}\right) \\ 0 & \text{otherwise} \end{cases} \quad \text{[Equation 11]}$$

It should be noted that the zero-padded area in $F(k_{\uparrow s})$ remains zero in $F((k_{\uparrow s})^\dagger)$.

Regarding the right side of Equation 7, the upsampled inverse kernel $k^\dagger{}_{\uparrow_s}$ for the blur kernel 'k' may be derived as Equation 12 from Equations 8 and 6.

$$(k_{\uparrow_s})^\dagger = F^{-1}(F(k^\dagger)_{\uparrow_s})$$

$$= F^{-1}\left(\left(F\left(F^{-1}\left(\frac{\overline{F(k)}}{|F(k)|^2 + \epsilon}\right)\right)\right)_{\uparrow_s}\right)$$

$$= F^{-1}\left(\left(\frac{\overline{F(k)}}{|F(k)|^2 + \epsilon}\right)_{\uparrow_s}\right)$$

[Equation 12]

Then Equation 13 may be obtained, from Equation 5, in the frequency domain.

$$F(k^\dagger_{\uparrow_s}) = \left(\frac{\overline{F(k)}}{|F(k)|^2 + \epsilon}\right)_{\uparrow_s}$$

$$= \begin{cases} \frac{\overline{F(k)}}{|F(k)|^2 + \epsilon} & \left(-\frac{w}{2} \le u \le \frac{w}{2}, -\frac{h}{2} \le v \le \frac{h}{2}\right) \\ 0 & \text{otherwise} \end{cases}$$

[Equation 13]

As Equations 11 and 13 are equivalent to each other, their spatial domain counterparts $(k_{\uparrow_s})^\dagger$ and $k^\dagger{}_{\uparrow_s}$ are equivalent to each other, also. This proves Equation 7.

Equation 4 has the scaling factor in both left and right sides. The upsampling operation in the left side of Equation 7 scales up a total intensity of the blur kernel 'k' by $s^2$ times. Similarly, the upsampling operation in the right side of Equation 7 also scales up the total intensity of inverse kernel 'k†' by $s^2$ times. Thus, to obtain a properly normalized inverse kernel in the left and right sides, the scaling factor $$\frac{1}{s^2}$$

is applied to '$k_{\uparrow_s}$' in the left side and to '$k^\dagger{}_{\uparrow_s}$' in the right side. Then, we obtain Equation 4.

FIG. 1 shows an example that two kernels on both sides of Equation 4 produce equivalent deblurring results. In FIG. 1, a portion (A) shows an exemplary blurred image out-of-focus due to a defocus blur, a portion (B) shows an exemplary image deblurred by use of the inverse kernel $$\left(\frac{1}{s^2}k_{\uparrow_s}\right)^\dagger$$

for the upsampled kernel '$k_{\uparrow_s}$', and a portion (C) shows an exemplary image deblurred by use of the upsampled kernel $$\frac{1}{s^2}(k^\dagger_{\uparrow_s})$$

for the inverse kernel 'k†'. There is little visual difference between the image of the portion (B) and the image of the portion (C). In detail, a peak signal-to-noise ratio (PSNR) of the images of the portion (B) and the portion (C) with respect to an original sharp image used to generate the blurred image of the portion (A) was 21.64 dB and 21.59 dB, respectively, and the PSNR between the images of the portion (B) and the portion (c) was 51.09 dB. Considering that there is little difference between the two images, it can be said that Equation 4 is valid also in an empirical point of view.

Regarding Equation 4, FIG. 1 shows that the upsampled kernel $$\frac{1}{s^2}(k^\dagger_{\uparrow_s})$$

for the inverse kernel 'k†' may serve as an inverse kernel of the upsampled kernel $$\backslash\frac{1}{s^2}k_{\uparrow_s}\prime.$$

As mentioned above, $$\frac{1}{s^2}(k^\dagger_{\uparrow_s})$$

is the upsampled kernel, for the inverse kernel 'k†' of the blur kernel 'k', upsampled by the same scale factor.

$$\backslash\frac{1}{s^2}\prime$$

is used to normalize kernel weights.

Based on the observations above, the defocus deblurring method of the present disclosure may utilize an inverse kernel for a certain shape to deblur the defocus blurs having different sizes but the same shape as the blur associated with the inverse kernel. That is, instead of predicting both the shape and size of the blur for each pixel position in the image, a shared reference shape of the blurs is predicted for the image and only the blur size is predicted for each pixel position to take the Equation 4 into account and effectively perform the deblurring of the blurs of varying sizes but with the same shape.

Further, since it is impractical to use the inverse kernels of all possible sizes in a convolutional neural network, it may be desirable to generate only a limited number of default inverse kernels corresponding to several sizes and combine deblurring results of the default inverse kernels to handle the blurs of the other sizes, so that the complexity of the network is reduced. By varying weights for combining the deblurring results of the default inverse kernels for each pixel, a result similar to the case of deblurring by use of a separate inverse kernel of a certain size for each of the pixels may be obtained. A spatially varying deconvolution for the defocus blurring which simulates the application of inverse kernels of varying sizes for the pixels may be approximated as follows.

$$x \approx \sum_i \left\{\alpha_i\left(\frac{1}{s^2}k^\dagger_{\uparrow_s} * y\right)\right\}$$

[Equation 14]

Here, $s_i \in \{1, \ldots, n\}$ is an upsampling factor, and $\alpha_i \in \mathbb{R}^{h \times w \times 1}$ is a per-pixel weight map for the result image obtained using the inverse kernel having the upsampling factor of $s_i$.

Equation 14 may be modified to represent the defocus blurring using multiple convolutional layers as Equation 15.

$$h_2 = K^f * \bigwedge_{i=1}^{n} \{\alpha_i \cdot (K_{s_i} * h_1)\} \qquad \text{[Equation 15]}$$

Here, $h_1 \in \mathbb{R}^{h \times w \times c}$ and $h_2 \in \mathbb{R}^{h \times w \times c}$ denote input and output feature maps that correspond to images 'y' and 'x', respectively, in Equation 3. $K_{s_i} \in \mathbb{R}^{s_i k \times s_i k \times c \times c/2}$ are convolutional kernels representing an inverse kernel with an upsampling factor $s_i$. $K^f \in$ $$\mathbb{R}^{3 \times 3 \times \frac{nc}{2} \times c}$$

is a network weight matrix introduced for a non-linear aggregation of multiple scales of the outputs of $\{K_{s_i}\}$. $\alpha_i \in \mathbb{R}^{h \times w \times 1}$ is a per-pixel weight map for the scale $s_i$, and $\bigwedge \{\ \}$ denotes a concatenation operation. In order to take a full advantage of a nonlinear processing of the deep learning, the deblurring results are combined nonlinearly, by using the concatenation '$\bigwedge \{\ \}$' and a convolution with a network weight matrix, instead of linearly combining the deblurring results.

The inverse kernel of an arbitrary size may be represented by a plurality of convolutional layers having kernel sizes different from each other. In such a case, it is necessary for the convolutional layers to share kernel weights among them so as to represent the same blur shape. However, the weight sharing may not be straightforward because the convolutional kernels of different sizes contain different numbers of weights. In an exemplary embodiment, dilated kernels are used to enable the weight sharing among the convolutional layers. The use of the dilated kernels enables to represent various kernel sizes while maintaining an effective number of weights in the convolutional kernels.

Specifically, for a blurred region, a filtering operation on sparsely sampled pixels with a dilated kernel produce a similar result to the filtering operation on densely sampled pixels with a rescaled kernel. Thus, the upsampling operation for $$\frac{1}{s^2}(k_{\uparrow s}^{\dagger})$$

may be replaced by a dilation operation, yielding an inverse kernel applied to the sparsely sampled pixels. The dilation operation does not change the number of filter weights but only scales the spatial support of the kernel without resampling and enables the weight sharing for the convolutional kernels $\{K_{s_i}\}$.

To summarize $$\frac{1}{s^2} k_{\uparrow s'}$$

and '$k^{\dagger}_{\uparrow/s}$' equivalent deblurring results, where '$\uparrow/s$' denotes the dilation operation. Therefore, a network may be designed to include the dilated kernels, so that a plurality of independent convolutional layers may include similar inverse kernels for handling the defocus blur of the same shape through the kernel weight sharing. That is, the standard convolutions in Equation 15 may be substituted by atrous convolutional layers based on the dilated kernels as shown in Equation 16.

$$h_2 = K^f * \bigwedge_{i=1}^{n} \{\alpha_i \cdot (K_{/s_i} * h_1)\} \qquad \text{[Equation 16]}$$

Here, $K_{/s_i} \in \mathbb{R}^{k \times k \times c \times c/2}$ denotes a weight kernel with a dilation rate $s_i$ in the kernel-sharing atrous convolutional layer. An exemplary embodiment of the present disclosure fully exploit the nonlinear nature of the deep learning by aggregating the deblurring results nonlinearly by use of the concatenation and the convolution operations with the network weight matrix $K^f \in$ $$\mathbb{R}^{3 \times 3 \times \frac{nc}{2} \times c}$$

instead of linearly combining the deblurring results according to Equation 14.

The defocus deblurring method and apparatus based on the inverse kernel according to an exemplary embodiment of the present disclosure may be implemented based on theoretical basis described above.

FIG. 2 is a block diagram of a defocus deblurring apparatus according to an exemplary embodiment of the present disclosure. The defocus deblurring apparatus includes an encoder 100, a kernel-sharing parallel atrous convolutional (KPAC) unit 200, and a decoder 300. FIG. 3 is a table summarizing an example of a detailed structure of the defocus deblurring apparatus.

The encoder 100, which is configured to include a plurality of convolutional layers, transforms a blurred input image 10 into a feature map H1. The kernel-sharing parallel atrous convolutional (KPAC) unit 200 receives the feature map H1 and reduces blur component in the feature map H1 based on the inverse kernel to output a feature map H2 containing reduced defocus blur component. According to an exemplary embodiment, the KPAC unit 200 performs the defocus deblurring by kernel-sharing parallel atrous convolutional operations which replaces an inverse kernel estimation and convolutional operations based on the inverse kernel. The decoder 300 receives the feature map H2 containing the reduced defocus blur component and transforms the feature map H2 into a defocus deblurred sharp image 99.

As described above, according to an exemplary embodiment, the KPAC unit 200 reducing the defocus blur component in the input feature map H1 is disposed between the encoder 100 transforming the input image 10 into the input feature map H1 and the decoder 300 transforms the output feature map H2 into the output image 99. Accordingly, the KPAC unit 200 works on a feature map space rather than an actual image in a spatio-temporal domain, which may maximize the effect of the deep learning.

Figure 4:
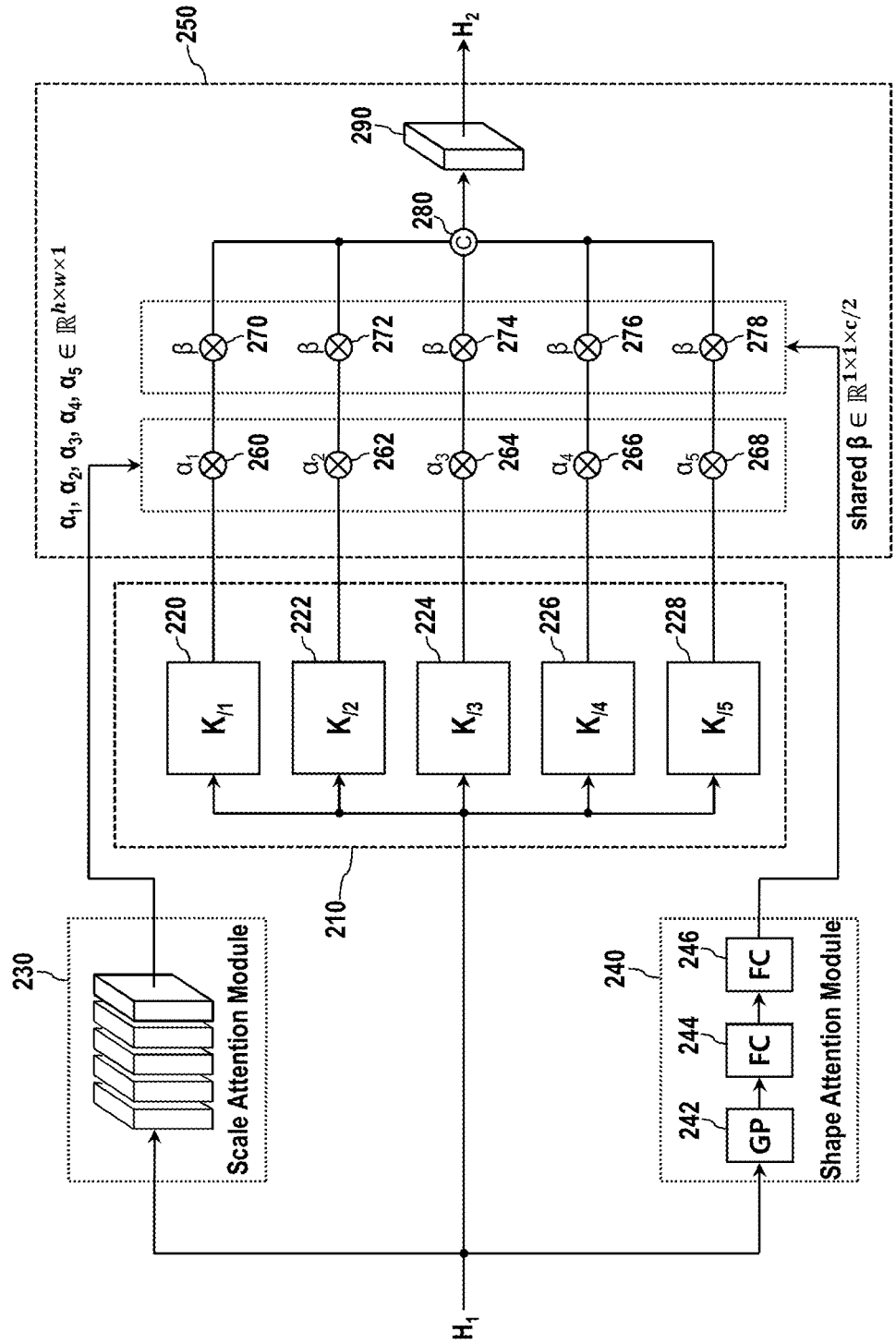
FIG. 4 is a detailed block diagram of a kernel-sharing parallel atrous convolutional (KPAC) unit shown in FIG. 2.

FIG. 4 is a detailed block diagram of the KPAC unit 200, and FIG. 5 is a table summarizing an example of a more detailed structure of the KPAC unit 200. Referring to FIG. 4, the KPAC unit 200 may include an atrous convolution module 210, a scale attention module 230, a shape attention module 240, and a fusion module 250.

The atrous convolution module 210 includes a plurality of atrous convolutional layers 220-228 arranged in parallel. The plurality of atrous convolutional layers 220-228 may represent the inverse kernels having the same shape but different sizes, and the kernels of the atrous convolutional layers 220-228 share the weights so as to reliably satisfy the constraint that the inverse kernels have the same shape. In order that the kernel weights are shared among the kernels of the atrous convolutional layers of different sizes, the dilated kernels are used in an exemplary embodiment. In FIG. 4, a second through fifth atrous convolutional layers 222-228 employ atrous convolution kernels dilated from the kernel of a first atrous convolutional layer 220 at different dilation rates. Accordingly, the kernels of the second through fifth atrous convolutional layers 222-228 share the weights of the kernel of the first atrous convolutional layer 220.

For example, the first atrous convolutional layer 220 may include a 3×3 kernel with a dilation rate of 1. In this case, the second atrous convolutional layer 222 may include a 5×5 kernel with the dilation rate of 2. The third atrous convolutional layer 224 may include a 7×7 kernel with the dilation rate of 3. The fourth atrous convolutional layer 226 may include a 9×9 kernel with the dilation rate of 4. The fifth atrous convolutional layer 228 may include an 11×11 kernel with the dilation rate of 5. The dilation rate may be achieved by forming void positions between the rows and columns of the weight values to form a dilated kernel and padding zeroes in the void positions. Accordingly, the dilated kernels of the atrous convolutional layers 220-228 include substantially the same number of kernel weights regardless of the scale and share the kernel weights. Thus, the constraint regarding the shape of the inverse kernel is satisfied. Even though five atrous convolutional layers are illustrated in FIG. 4, the present disclosure is not limited thereto.

The scale attention module 230 determines how much of each convolutional layer output is to be used in the output feature map H2 for each pixel of the feature map. That is, the scale attention module 230 predicts a scale attention map $\alpha_i \in \mathbb{R}^{h \times w \times 1}$ which is a weight map working as a pixel-wise weight for a feature map output by a corresponding atrous convolutional layer 220-228 with respect to each pixel in the feature map. As shown in FIG. 5, the scale attention module 230 may include a plurality of the atrous convolutional layers and one general convolutional layer. A different scale attention map $\alpha_i \in \mathbb{R}^{h \times w \times 1}$ is applied to the feature map of each atrous convolutional layer 220-228. When the fusion module 250 aggregates the results of the convolutional operations of the plurality of atrous convolutional layers 220-228, the scale attention map allows to add the results of the convolutional operations at different ratios for each pixel of the feature map, so that the defocus blur of which size differ depending on the position may be removed effectively.

The shape attention module 240 supports an adjustment of the shape of the inverse kernels in consideration that the shape of the blur may slightly vary depending on the pixel position in an actual defocus-blurred image. The slight variation of the shape of the blur may require the corresponding change in the shape of the inverse kernel. As an atrous convolutional layer includes multiple convolution filters, different combinations of the filters may represent different inverse kernels. The shape attention module 240 determines a channel-wise weight vector $\beta \in$ $$\mathbb{R}^{1 \times 1 \times \frac{c}{2}}$$

to provide to the fusion module 250. The channel-wise weight vector $\beta \in$ $$\mathbb{R}^{1 \times 1 \times \frac{c}{2}}$$

may be used to adjust the weight of each filter output provided to form the output feature map H2. Since the atrous convolutional layers 220-228 associated with respective dilation rates use the kernels of the same shape, the channel-wise weight vector $\beta$ may also be shared for the feature maps of the atrous convolutional layers 220-228. As shown in FIG. 5, the shape attention module 240 may include a global average pooling (GP) layer 242 and two fully connected (FC) layers 244 and 246. The global average pooling layer 242 reduces a resolution of the feature map by calculating an average of feature values of for each channel. The fully connected layers 244 and 246 filter the features in a global domain rather than a local domain.

In an exemplary embodiment, the fusion module 250 includes a first through fifth element-wise multipliers 260-268, a sixth to tenth element-wise multipliers 270-278, and a concatenators 280, and a convolutional layer 310.

Each of the first through fifth element-wise multipliers 260-268 multiplies an operation result of corresponding one of the atrous convolutional layers 220-228 by a corresponding scale attention map $\alpha_i \in \mathbb{R}^{h \times w \times 1}$ from the scale attention map 230. For example, the first element-wise multiplier 260 multiplies the operation result of the first atrous convolutional layer 220 by a first scale attention map $\alpha_1 \in \mathbb{R}^{h \times w \times 1}$. The second element-wise multiplier 262 multiplies the operation result of the second atrous convolutional layer 222 by a second scale attention map $\alpha_2 \in \mathbb{R}^{h \times w \times 1}$. The third to fifth element-wise multipliers 264-268 also operate in the same manner.

Each of the sixth through tenth element-wise multipliers 270-278 multiplies an operation result of corresponding one of the first through fifth element-wise multipliers 260-268 by the shape attention weight vector $\beta$ from the shape attention module 240. For example, the sixth element-wise multiplier 270 multiplies the operation result of the first element-wise multiplier 260 by the shape attention weight vector $\beta$. The seventh element-wise multiplier 272 multiplies the operation result of the second element-wise multiplier 262 by the shape attention weight vector $\beta$. The eighth to tenth element-wise multipliers 274-278 also operate in the same manner.

The concatenator 280 concatenates the outputs of the sixth through tenth element-wise multipliers 270-278. Accordingly, the operation results of the atrous convolutional layers 220-228 are concatenated after the multiplications by the scale attention map $\alpha_i \in \mathbb{R}^{h \times w \times 1}$ from the scale attention map 230 and the shape attention weight vector $\beta$ from the shape attention module 240. The convolutional layer 310 performs a convolution of a concatenation result and the network weight matrix $K^f \in$ $$\mathbb{R}^{3 \times 3 \times \frac{nc}{2} \times c}$$

to non-linearly aggregate the operation results of the atrous convolutional layers 220-228 and output an aggregation result as the output feature map H2 containing reduced defocus blur component.

Figure 6:
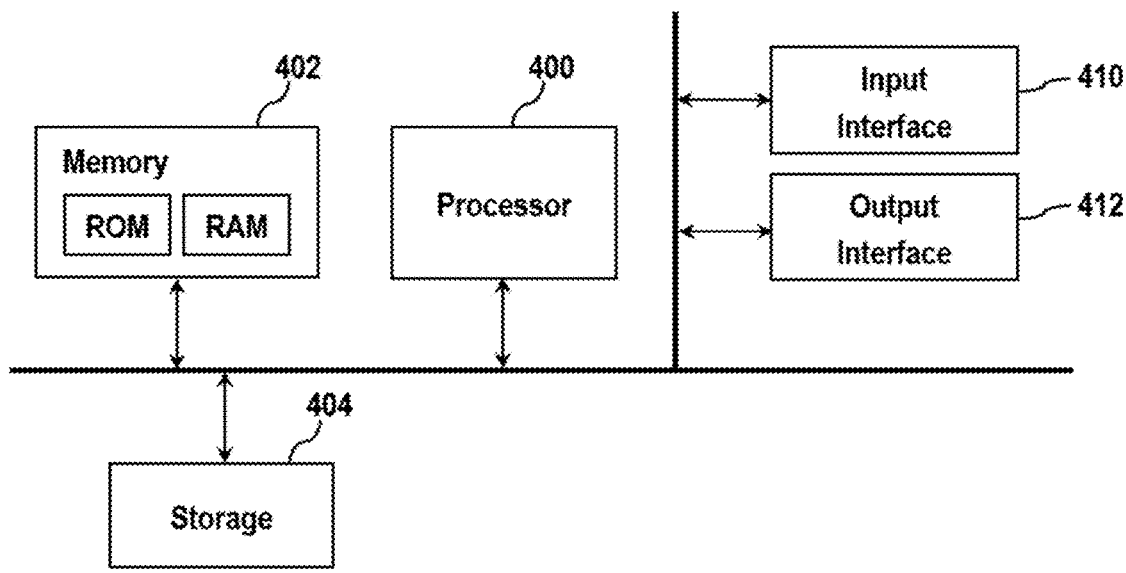
FIG. 6 is a block diagram showing a physical configuration of an embodiment of the defocus deblurring apparatus shown in FIG. 2.

FIG. 6 is a block diagram showing a physical configuration of an embodiment of the defocus deblurring apparatus shown in FIG. 2. The defocus deblurring apparatus may include a processor 400, a memory 402, and a storage 404. In addition, the defocus deblurring apparatus may further include an input interface device 410 and an output interface device 412. The components of the defocus deblurring apparatus may be connected to each other by a bus.

The processor 400 may execute program instructions stored in the memory 402 or the storage 404 to perform the defocus deblurring method according to the present disclosure. The processor 400 may include a central processing unit (CPU) or a graphics processing unit (GPU), or may be implemented by another kind of dedicated processor suitable for performing the method of the present disclosure. The memory 402 may load the program instructions stored in the storage 404 to provide to the processor 400 so that the processor 400 may execute the program instructions. The memory 402 may include, for example, a volatile memory such as a read only memory (ROM) and a nonvolatile memory such as a random access memory (RAM). In addition, the memory 402 may temporarily store the input image, the output image, the kernel weights, and the feature map data, as well as data generated in the course of the execution of the program instructions for the defocus deblurring.

The storage 404 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The program instructions stored in the storage 404 is suitable for implementing the defocus deblurring method according to the present disclosure. In addition, the data stored in the storage 404 may include data that needs to be stored for a long time, e.g., the kernel weights and the feature map data.

Figure 7:
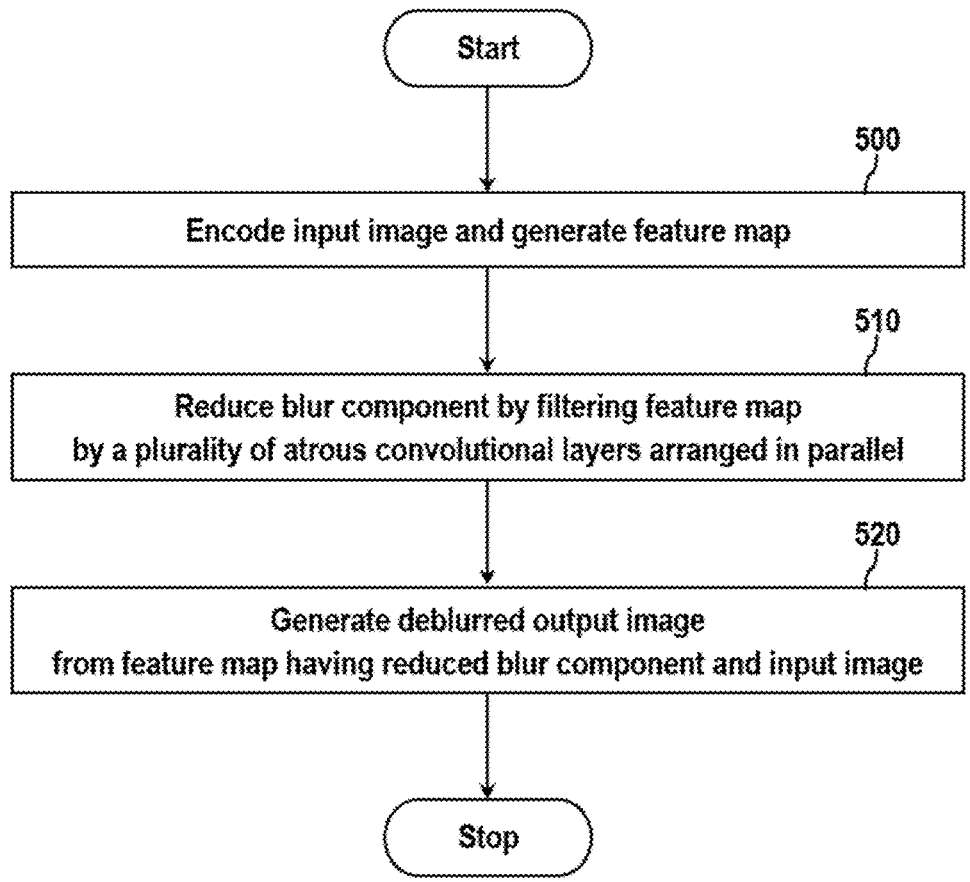
FIG. 7 is a flowchart illustrating a defocus deblurring method according to an exemplary embodiment of the present disclosure.

FIG. 7 is a flowchart illustrating a defocus deblurring method according to an exemplary embodiment of the present disclosure.

In order to perform the defocus deblurring by the defocus deblurring apparatus shown in FIG. 2, a training or learning of the defocus deblurring apparatus may be required first. The defocus deblurring apparatus may be trained by a common learning method used in a deep neural network such as a supervised learning. For example, when there is an image pair including an input image containing the defocus blur and a ground truth sharp image corresponding to the input image and containing little blur, the defocus deblurring apparatus may be trained by applying the input image to the defocus deblurring apparatus, calculating the loss function to compare the output of the defocus deblurring apparatus against the ground truth sharp image, and propagating an error backward in the network.

The loss function used to train the defocus deblurring apparatus may be a mean absolute error (MAE) between the network output and the corresponding ground truth sharp image. In addition a perceptual loss may be used along with or instead of the MAE to restore a more realistic texture. The perceptual loss, if used, may be combined with the MAE, in which case a balancing factor may be 7×10−4 for the perceptual loss.

In deblurring the defocus blur by the defocus deblurring apparatus that has been trained, the input image is encoded by the encoder 100 to generate a feature map (operation 500). Next, the feature map is filtered by a plurality of convolutional layers arranged in parallel to reduce the blur component (operation 510). Then, an output image with reduced blur is generated from the feature map with reduced blur and the input image (operation 520). Since the filtering operation has been described in detail above, a duplicate description thereof will be omitted for simplicity.

Figure 8:
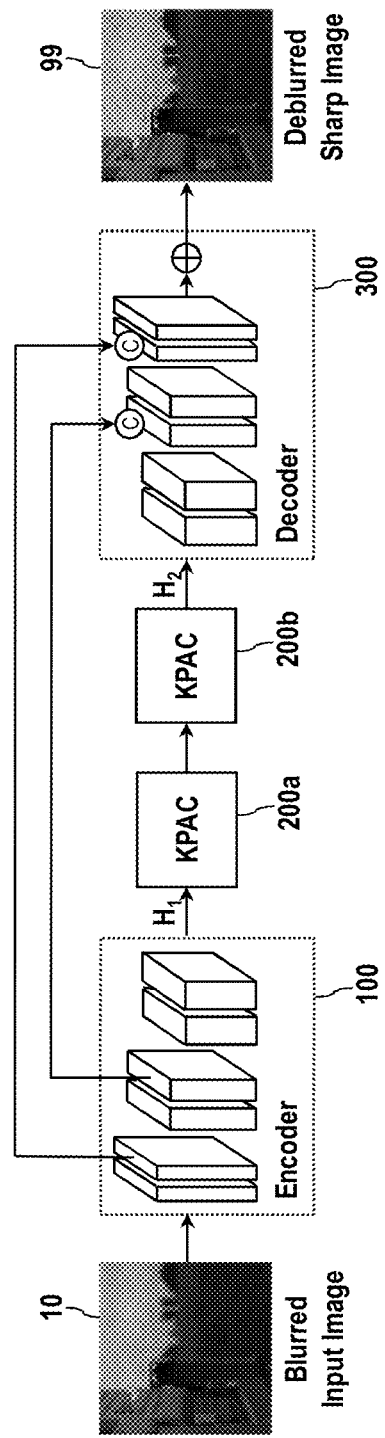
FIG. 8 is a block diagram of a defocus deblurring apparatus according to another exemplary embodiment of the present disclosure.

FIG. 8 is a block diagram of a defocus deblurring apparatus according to another exemplary embodiment of the present disclosure. The defocus deblurring apparatus according to the present embodiment includes two KPAC units 200A and 200B contrary to the embodiment of FIG. 2 including a single KPAC unit 200. The two units 200A and 200B stacked together may iteratively remove the defocus blur to achieve higher-quality deblurring results. Furthermore, the defocus deblurring apparatus may include three or more KPAC units.

In addition, the defocus deblurring apparatus may be variously changed or modified as long as the network structure in which the KPAC unit is disposed between the encoder and the decoder is maintained. The number or size of filters in each KPAC unit may be changed arbitrarily, and the size of the input image is not limited to a particular size.

Experiments and Evaluations

The defocus deblurring apparatus according to an exemplary embodiment was implemented and evaluated using Tensorflow 1.10.0 with NVIDIA Titan Xp GPU. The model in the defocus deblurring apparatus includes two KPAC units with a kernel size k=5 and the number of atrous convolutional layers n=5. A negative slope coefficient $\lambda$=0.2 was used for the LeakyReLU activation layers. An Adam optimizer with $\beta1$=0.9 and $\beta2$=0.99 was used to train the model. The model was trained by 200,000 iterations at a fixed learning rate of 1×10−4. The inventors tried to train the model by more iterations with at a lowered learning rate, but the improvement was marginal in PSNR. For an evaluation, the model was trained with a perceptual loss. In this case, the model was initialized with a pre-trained model trained through 200,000 iterations with the MAE. Then, the network was fine-tuned using both the MAE and the perceptual loss through 100,000 iterations at a fixed learning rate of 5×10−5. A batch size of 4 was used. Each image in the batch was randomly cropped to 512×512.

A DPDD dataset disclosed in A. Abuolaim and M. S. Brown. *Defocus deblurring using dual-pixel data*. In Proc. ECCV, 2020, was used for a model evaluation. This dataset provides 500 image pairs of real-world defocused images and their corresponding all-in-focus ground-truth images captured with Canon EOS 5D Mark IV. The dataset consists of training, validation, and testing sets of 350, 74, and 76 image pairs, respectively. In the experiment, the model was trained and evaluated using the training set and the test set, respectively. While the dataset also provides dual pixel data, they were not used in the experiment. The dataset provides 16-bit images in PNG format, which were converted into an 8-bit images for the experiment.

Figures 9, 10:
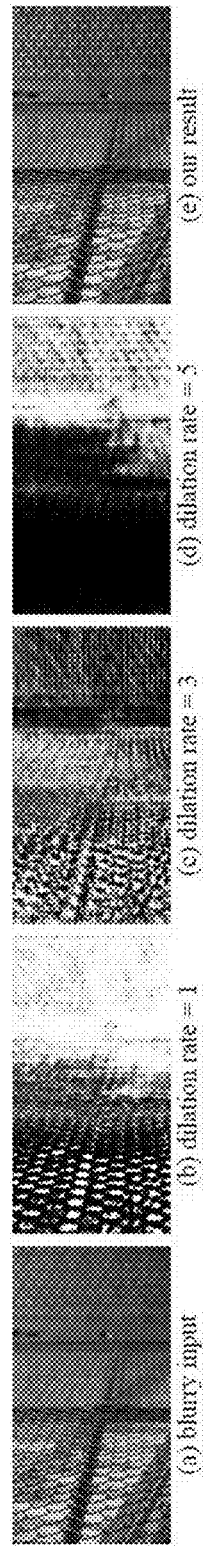
FIG. 9 is a table summarizing results of evaluating an effect of weight sharing in the defocus deblurring apparatus in terms of PSNR and a number of parameters.
FIG. 10 shows a visualization of scale attention maps for different atrous convolutional layers in a first block of a two-block network including two KPAC units.

The KPAC unit 200 learn spatially varying inverse kernels whose shapes remain the same but their sizes vary. For effective learning of the inverse kernels, the network of the present disclosure shares the convolution weights across multiple atrous convolutional layers. An effect of weight sharing between atrous convolutional layers was verified by comparing the performance of the models with and without weight sharing. Both models have two KPAC units with 5×5 kernels. FIG. 9 is a table showing the deblurring quality and the number of parameters of each model. As can be seen in this table, the model using the weight sharing not only reduces the number of the learning parameters but also improves the deblurring quality, which confirms that the weight sharing structure properly constrains and guides the learning process.

To analyze how the atrous convolutional layers are activated for the defocus blurs of different sizes, scale attention maps of the different atrous convolutional layers were visualized. The roles of the different attention maps may not be strictly distinguished because of the nature of the learning process that implicitly learns the use of different layers. Nevertheless, it was possible to observe a clear tendency that the attention maps of different dilation rates are activated for different blur sizes. For example, an attention map with the dilation rate of 1 was activated for pixels with blur of almost any size. On the other hand, the attention map with a dilation rate of 5 was activated only for pixels with large blur. This shows that the method of the present disclosure works well for dealing with the defocus blurs of which sizes vary spatially. FIG. 10 shows a visualization of the scale attention maps for different atrous convolutional layers in a first block of a two-block network including two KPAC units;

To quantitatively analyze the effect of each component in the KPAC unit 200, an ablation study was conducted. First, a baseline model using naive convolution blocks instead of the KPAC unit was prepared. For the baseline model, a conventional residual block consisting of two convolutional layers of the filter size of 3×3 was used. For a fair comparison, the baseline model included a plurality of convolution blocks, so that the model size of the baseline model is similar to that of the model of the present disclosure but without the weight sharing. In addition, four variants of the baseline model using two KPAC unit with the kernel size of 5×5 were prepared, and the deblurring performance of the models was measured. A measurement result revealed that every components of the network according to the present disclosure increase the deblurring quality significantly. It was found that both the scale attention and the shape attention help the network of the present disclosure to better handle the spatially varying blur and restore the fine structure while the model without at least one of the scale attention and the shape attention may not properly handle the spatially varying blur.

The effect of the dilation rates of the atrous convolutional layers in handling the defocus blurs with varying scales was analyzed. In the test, the attention weight maps $\alpha 1$-$\alpha 5$ were manually modulated to make the pre-trained network use only the feature maps produced by the atrous convolutional layers of specified scales. It was observed that the atrous convolutions with the dilation rates of 1, 3, and 5 were helpful in removing blurs of nay, medium, and large sizes, respectively.

A plurality of KPAC units may be stacked together so that the network can iteratively remove the defocus blur to achieve higher-quality deblurring results. The performance according to the number of the KPAC units was investigated. FIG. 11 is a table showing the deblurring effects according to the number of the KAPC units. It can be seen that even the use of a single KPAC unit may effectively remove the defocus blur and increase the PNSR by 0.90 dB. Employment of more KPAC units increased the PSNR but reduced the degree of improvement. When three or more KPAC units are used, employment of additional KPAC unit decreased the PSNR possibly due to an increased training complexity. Based on this experiment, the final model was designed to include two KPAC units as the two units provides relatively high deblurring quality with a small model size.

The defocus deblurring method of the present disclosure was compared with conventional deblurring methods including two-step approaches and end-to-end deep learning-based method. For all the methods, deblurred images were produced using the source codes provided by the respective authors or inventors. In case of JNB model (J. Shi, L. Xu, and J. Jia. *Just noticeable defocus blur detection and estimation*. In Proc. CVPR, 2015.), EBDB model (A. Karaali and C. Jung. *Edge-based defocus blur estimation with adaptive scale selection*. IEEE Trans. Image Processing (TIP), 27(3):1126-1137, 2018.), and DMENet model (J. Lee, S. Lee, S. Cho, and S. Lee. *Deep defocus map estimation using domain adaptation*. In Proc. CVPR, 2019.), the deblurred images were generated by a non-blind deconvolution method using estimated defocus maps. In case of DPDNet method (A. Abuolaim and M. S. Brown. *Defocus deblurring using dual-pixel data*. In Proc. ECCV, 2020.), the source codes provided by the authors and a pre-trained model were used. DPDNet provides two versions of models, each of which takes a single input image and dual-pixel data, which is a pair of sub-aperture images, respectively. Both of them were included in the comparison. For evaluation, the PSNR and a structural similarity index (SSIM) were measured. A learned perceptual image patch similarity (LPIPS) metric was measured also to evaluate the perceptual quality.

Two variants of the model of the present disclosure were included in the evaluation. Each of the two models has a different number of encoding levels or a different number of downsampling layers in the encoder. An increased encoding level may facilitate handling of large blurs with small filters and with a small amount of computations. On the other hand, the fewer encoding levels may make it easier to recover fine details. To inspect the difference between models having different numbers of encoding levels, one of the two variant models was configured to have two encoding levels and the other one of the two invariant models was configured to have three encoding levels. Both models were trained with both the MAE and the perceptual loss function.

FIG. 12 is a table summarizing results of quantitative comparison with conventional deblurring methods. As can be seen in the table, classical two-step approaches perform worse than the recent deep learning-based methods. While the DPDNet model using a single input image performs better than the conventional approaches, the models of the present disclosure significantly outperform both the classical approaches and the DPDNet model using the single input image. Moreover, the models of the present disclosure significantly outperform the dual-pixel-based DPDNet model even without a strong queue to the defocus blur provided by dual-pixel data and with far fewer parameters. This result clearly demonstrates the effectiveness of the method of the present disclosure.

Figure 13:
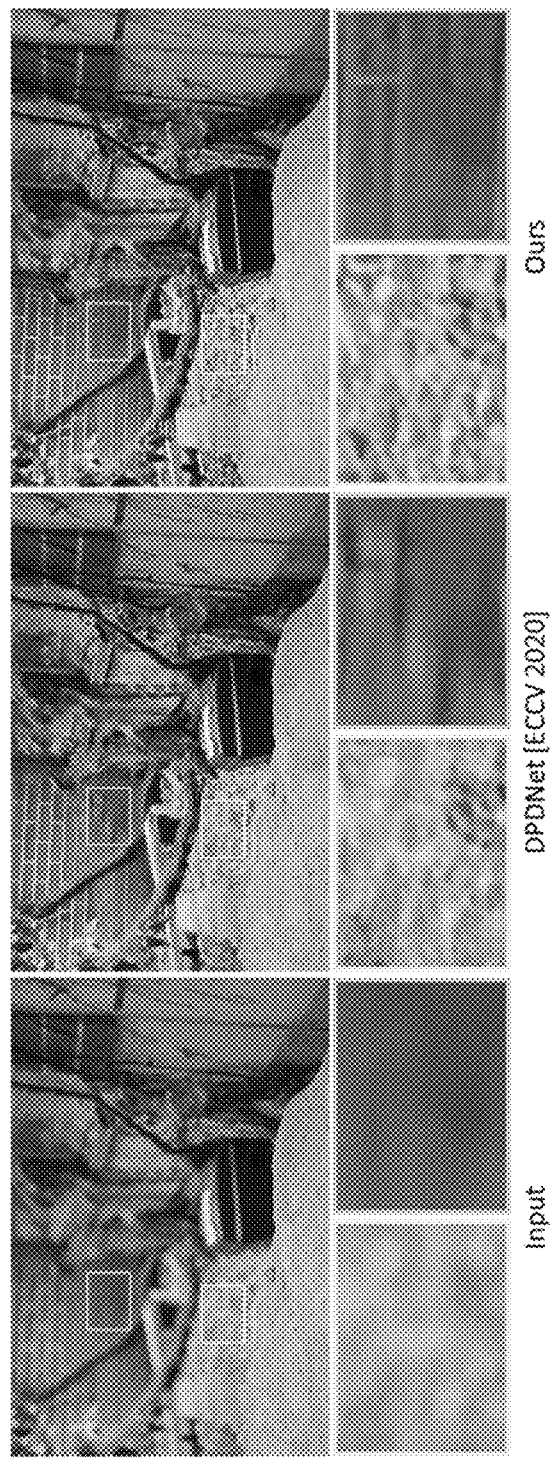
FIG. 13 shows results of qualitative comparisons of the deblurring effect of the deblurring method according to an exemplary embodiment of the present disclosure with another deblurring method.

FIG. 13 shows results of qualitative comparisons of the deblurring effect of the deblurring method according to an exemplary embodiment of the present disclosure with another deblurring methods. As can be seen in FIG. 13, the deblurring method according to an exemplary embodiment of the present disclosure exhibits a better visual performance than the existing method. Therefore, the method of the present disclosure reveals higher qualitative performance with a much smaller neural network and less computational amount than the existing method.

The device and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of reducing defocus blur from an input image, comprising:
    generating, by a processor executing at least one program instruction, using an encoder network, an input feature map by encoding the input image;
    predicting, by the processor, a reference shape of a plurality of blurs shared with a plurality of pixels of the input image, based on the input feature map;
    predicting, by the processor, a size of each blur for a position of each pixel without a shape of each blur for the position of each pixel;
    generating, by the processor, a plurality of inverse kernels for deblurring the input image, based on predicted sizes of the plurality of blurs and the reference shape;
    filtering, by the processor, using an atrous convolution network including a plurality of atrous convolutional layers, constructed based on the plurality of inverse kernels, arranged in parallel, the input feature map to generate an output feature map having reduced blur component; and
    generating, by the processor, using a decoder network, an output image having reduced blur component from the output feature map with the reduced blur component and the input image,
    wherein each of the plurality of atrous convolution layers being configured to share common convolution kernel weights corresponding to an inverse blur kernel having common shape based on the reference shape with respect to a dilation rate and having a size related to the dilation rate.

2. The method of claim 1, wherein filtering the input feature map to generate the output feature map having reduced blur component comprises:
    filtering the input feature map consecutively by a plurality of atrous convolution network connected in series to repeatedly reduce the blur component.

3. The method of claim 1, wherein the plurality of atrous convolutional layers comprises respective convolutional kernels containing kernel weights shared with the other atrous convolutional layers.

4. The method of claim 3, wherein the convolutional kernels of the plurality of atrous convolutional layers are dilated by dilation rates different from each other.

5. The method of claim 4, wherein filtering the input feature map to generate the output feature map having reduced blur component comprises:
    performing convolutions between the input feature map and each of the convolutional kernels of the plurality of atrous convolutional layers in parallel to acquire a plurality of convolution results; and
    nonlinearly aggregating the plurality of convolution results by concatenating the plurality of convolution results and performing a convolution between a concatenation result and a network weight.

6. The method of claim 5, wherein filtering the input feature map to generate the output feature map having reduced blur component further comprises:
    determining scale attention maps each comprising pixel-wise weights for respective one of the plurality of convolution results,
    wherein nonlinearly aggregating the plurality of convolution results comprises:
        multiplying each of the plurality of convolution results by a corresponding scale attention map;
        concatenating a plurality of multiplication results; and
        performing the convolution between the concatenation result and the network weight.

7. The method of claim 6, wherein filtering the input feature map to generate the output feature map having reduced blur component further comprises:
    determining a channel-wise weight vector for compensating for a variation of a shape of the defocus blur in the input image according to a pixel position,
    wherein nonlinearly aggregating the plurality of convolution results comprises:
        multiplying each of the plurality of convolution results by a corresponding scale attention map;
        multiplying each of a plurality of multiplication results by the channel-wise weight vector;
        concatenating a plurality of multiplication results multiplied by the channel-wise weight vector; and
        performing the convolution between the concatenation result and the network weight.

8. An apparatus for reducing defocus blur from an input image, comprising:
    a memory storing program instructions; and
    a processor coupled to the memory and executing the program instructions stored in the memory,
    wherein the processor, is configured to:
        generate an input feature map by encoding the input image;

predict a reference shape of a plurality of blurs shared with a plurality of pixels of the input image, based on the input feature map;

predict a size of each blur for a position of each pixel without a shape of each blur for the position of each pixel;

generate a plurality of inverse kernels for deblurring the input image, based on predicted sizes of the plurality of blurs and the reference shape;

filter, using an atrous convolution network comprising a plurality of atrous convolutional layers, constructed based on the plurality of inverse kernels, arranged in parallel, the input feature map to generate an output feature map having reduced blur component; and generate an output image having reduced blur component from the output feature map with the reduced blur component and the input image, and wherein each of the plurality of atrous convolution layers being configured to share common convolution kernel weights corresponding to an inverse blur kernel having common shape based on the reference shape with respect to a dilation rate and having a size related to the dilation rate.

9. The apparatus of claim 8, wherein the processor, to filter the input feature map to generate the output feature map having reduced blur component, is further configured to:

filter the input feature map consecutively by a plurality of atrous convolution network connected in series to repeatedly reduce the blur component.

10. The apparatus of claim 8, wherein the plurality of atrous convolutional layers comprises respective convolutional kernels containing kernel weights shared with the other atrous convolutional layers.

11. The apparatus of claim 10, wherein the convolutional kernels of the plurality of atrous convolutional layers are dilated by dilation rates different from each other.

12. The apparatus of claim 11, wherein the processor is further configured to:

perform convolutions between the input feature map and respective convolutional kernels in parallel to acquire a plurality of convolution results, using the plurality of atrous convolutional layers in the atrous convolution network; and nonlinearly aggregate the plurality of convolution results by concatenating the plurality of convolution results and performing a convolution between a concatenation result and a network weight.

13. The apparatus of claim 12, wherein the processor is further configured to:

determine scale attention maps each comprising pixel-wise weights for respective one of the plurality of convolution results; and nonlinearly aggregate the plurality of convolution results by multiplying each of the plurality of convolution results by a corresponding scale attention map, concatenating a plurality of multiplication results, and performing the convolution between the concatenation result and the network weight.

14. The apparatus of claim 13, wherein the processor is further configured to:

determine a channel-wise weight vector for compensating for a variation of a shape of the defocus blur in the input image according to a pixel position; and nonlinearly aggregate the plurality of convolution results by multiplying each of the plurality of convolution results by a corresponding scale attention map, multiplying each of a plurality of multiplication results by the channel-wise weight vector, concatenating a plurality of multiplication results multiplied by the channel-wise weight vector, and performing the convolution between the concatenation result and the network weight.

* * * * *